United States Patent [19]
Warwick

[11] Patent Number: 5,408,259
[45] Date of Patent: Apr. 18, 1995

[54] DATA MODULATION ARRANGEMENT FOR SELECTIVELY DISTRIBUTING DATA

[75] Inventor: Alastair A. Warwick, Ottawa, Canada

[73] Assignee: Northern Telecom Limited, Montreal, Canada

[21] Appl. No.: 175,455

[22] Filed: Dec. 30, 1993

[51] Int. Cl.⁶ .............................................. H04N 7/16
[52] U.S. Cl. ......................................... 348/6; 348/12; 455/3.1
[58] Field of Search ................... 348/6, 8, 12; 455/3.1, 455/4.1, 5.1, 6.1; 370/11, 69.1, 71, 72, 73, 124; H04N 7/16, 7/173; 375/39, 67, 52, 38

[56] References Cited

U.S. PATENT DOCUMENTS

| 4,994,909 | 2/1991 | Graves et al. | 455/5.1 |
| 5,073,899 | 12/1991 | Collier et al. | 370/11 |

FOREIGN PATENT DOCUMENTS

| 0137158 | 4/1985 | European Pat. Off. | H04N 7/173 |
| 0158548 | 10/1985 | European Pat. Off. | H04N 71/173 |
| 0431816 | 6/1991 | European Pat. Off. | G08B 13/18 |

*Primary Examiner*—James J. Groody
*Assistant Examiner*—Chris Grant
*Attorney, Agent, or Firm*—R. John Haley

[57] ABSTRACT

A cable television distribution arrangement is supplied via optical fibers with additional digital signals which are delivered to customers via coaxial drop cables modulated at frequencies above those of the conventional analog television channels. A reduction in the required number of modulators is achieved, while delivering individually selected signals to individual customers, by supplying digital signals for a group of customers to a first modulator and a pseudo dam signal to a second modulator, and selecting between the outputs of the two modulators individually for each customer in the group. Switching between the outputs of the modulators is carried out during overhead information which is additionally supplied commonly to both modulators.

13 Claims, 2 Drawing Sheets

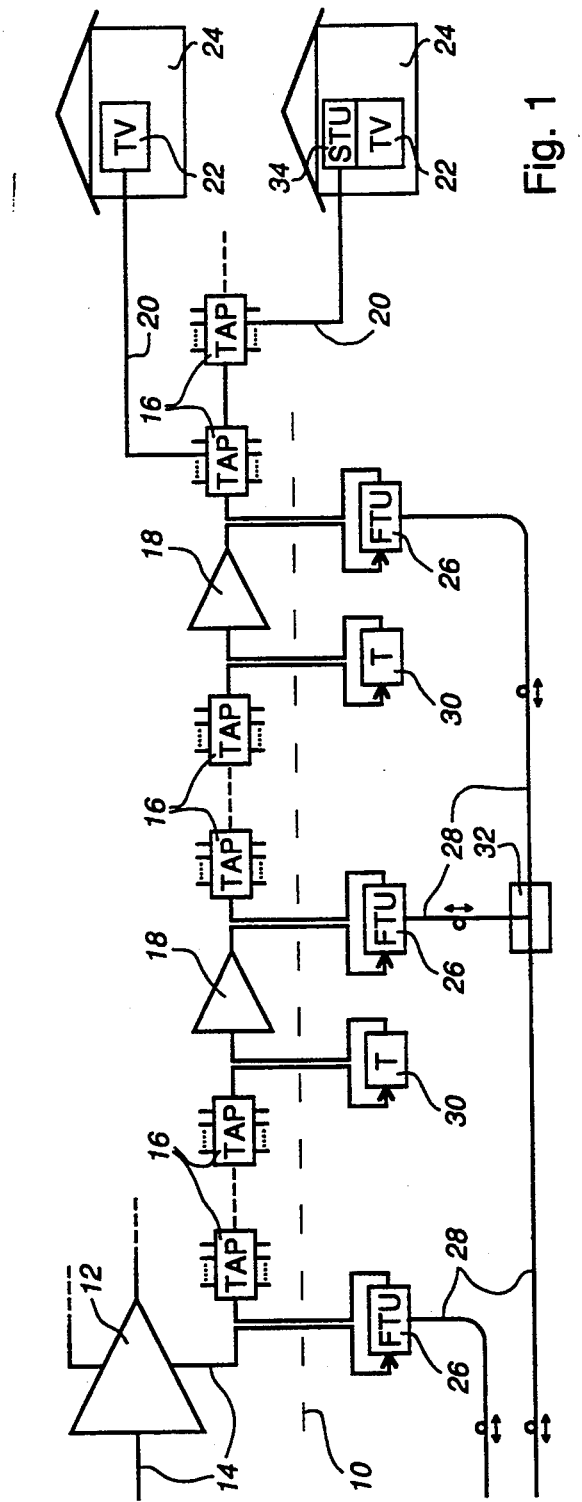
Fig. 1
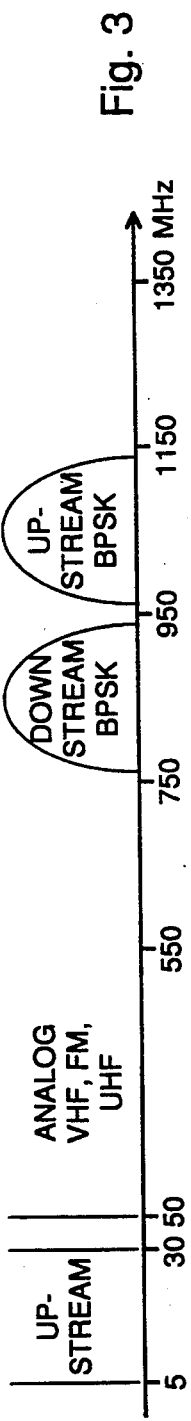
Fig. 2
Fig. 3

DATA MODULATION ARRANGEMENT FOR SELECTIVELY DISTRIBUTING DATA

This invention relates to data modulation arrangements, and is particularly concerned with a data modulation arrangement for selectively distributing data. A particular example of the use of such an arrangement is to facilitate selective distribution of broadcast digital television signals to subscribers in a television distribution network.

BACKGROUND OF THE INVENTION

Cable television distribution arrangements are well known. In such arrangements, analog television signals are carried to customers via a branched coaxial cable which includes bridger amplifiers, line extenders, and customer taps. Each television signal occupies a 6 MHz channel at a frequency from about 50 MHz to about 550 MHz or more. The upper frequency is limited by the bandwidth of the bridger amplifiers and line extenders and the attenuation of the coaxial cable, which as is well known increases with increasing frequency.

There is an increasing desire for additional capacity in cable television distribution arrangements. This demand includes a desire for additional broadcast television signals in analog or compressed digital form, additional facilities including for example video-on-demand (VOD) and near-VOD services (e.g. movies broadcast with stepped starting times), and a desire for transmission of control and possibly other information in the opposite, upstream, direction via the network.

To meet this desire, various ways have been proposed for supplying additional signals via a cable television distribution arrangement, typically involving the supply of such signals via optical fibers to appropriate points in the coaxial cable system with delivery of the signals to the customer premises via the coaxial cable, referred to as the drop cable, which already exists from the customer tap to the customer premises.

It is desired to supply to each customer only those services or television signals for which the customer has agreed to pay. As different customers have different preferences, there is a need to provide, at each customer tap, equipment which extracts from all of the signals which are available on the network only those which are allocated for each particular customer. Only these signals are then delivered in modulated form for transmission to the customer via the respective drop cable.

One way of doing this is to provide an individual modulator for each customer. However, this requires a large number of modulators, each of which is powered via the coaxial cable, with consequent disadvantages of high complexity, costs, and power consumption and dissipation. An alternative is to provide a modulator which is common to a group of customers; however, this falls to meet the above desire in that it delivers to all customers in the group the signals for which only one customer in that group may have agreed to pay, thus involving a risk of other customers in the group receiving signals to which they are not entitled.

Accordingly, an object of this invention is to provide an improved data modulation arrangement for selectively distributing dam.

SUMMARY OF THE INVENTION

According to one aspect of this invention them is provided a data modulation arrangement for selectively distributing data to a plurality of outputs, comprising: a first modulator responsive to a digital data signal to produce a first modulated signal; a second modulator responsive to a digital pseudo data signal to produce a second modulated signal; a plurality of multiplexers each for supplying a modulated signal to a respective one of said plurality of outputs, each multiplexer having first and second inputs to which the fast and second modulated signals, respectively, are supplied; and a control unit for controlling each multiplexer to supply the first and the second modulated signals selectively to the respective output; wherein the control unit is arranged to supply additional information simultaneously in both the data signal and the pseudo data signal, and to control each multiplexer to switch between the first and second modulated signals at its inputs only during said additional information. This facilitates continuity of the RF spectrum of the signal produced at each output.

The additional information can conveniently comprise overhead information to accompany the dam.

In an embodiment of the invention described below, the outputs comprise coaxial drop cables of a cable television distribution arrangement, the first and second modulators modulate the data signal and the pseudo data signal, respectively, to frequencies greater than 550 MHz, and each of the first and second modulators comprises a binary phase shift keyed modulator and an upconverter.

Another aspect of this invention provides a television signal distribution network including drop cables each to a respective customer for supplying analog television signals in a predetermined frequency range, the network further including a drop unit for supplying to a plurality of drop cables digital signals modulated at frequencies above said frequency range, the drop unit comprising: a plurality of multiplexers each having first and second inputs and an output coupled to a respective one of said plurality of drop cables; a first modulator, for modulating digital signals for customers associated with said plurality of drop cables to frequencies above said predetermined frequency range, having an output coupled to the first input of each of the plurality of multiplexers; a second modulator for modulating a pseudo data signal to said frequencies above said predetermined frequency range, having an output coupled to the second input of each of the plurality of multiplexers; and a control unit for controlling each of the plurality of multiplexers to couple its first or its second input selectively to its output; wherein the first modulator is arranged to modulate additional information with the digital signals, the second modulator is arranged simultaneously to modulate the additional information with the pseudo data signal, and the control unit is arranged to control each multiplexer to switch between its first and second inputs only during the additional information.

The invention also provides a method of supplying digital signals selectively to each of a plurality of customers, comprising the steps of: supplying digital signals for one or more customers in a group of customers from a source of digital signals to a modulator to produce a data modulated signal; producing a pseudo data modulated signal having similar spectral characteristics to those of the data modulated signal; and selectively supplying the data modulated signal and the pseudo data modulated signal to each customer in said group so that each customer in said group is supplied with the data modulated signal in respect of digital signals for that customer and otherwise is supplied with the pseudo dam modulated signal; wherein parts of the pseudo data modulated signal are substantially identical to simultaneously occurring pans of the data modulated signal, and switching between the data modulated signal and the pseudo data modulated signal for each customer is carried out only during said parts of the modulated signals. Said parts of the modulated signals can conveniently comprise overhead information for the customers.

Conveniently the step of producing the pseudo data modulated signal comprises the step of supplying a source of pseudo data to a second modulator.

BRIEF DESCRIPTION OF THE DRAWINGS

The invention will be further understood from the following description with reference to the accompanying drawings, in which:

FIG. 1 schematically illustrates a network comprising a cable television distribution arrangement with an additional bidirectional transmission capability, to which an embodiment of this invention is applied;

FIGS. 2 and 3 illustrate radio frequency spectra at different points in the network of FIG. 1;

detailed description

Figure 5:
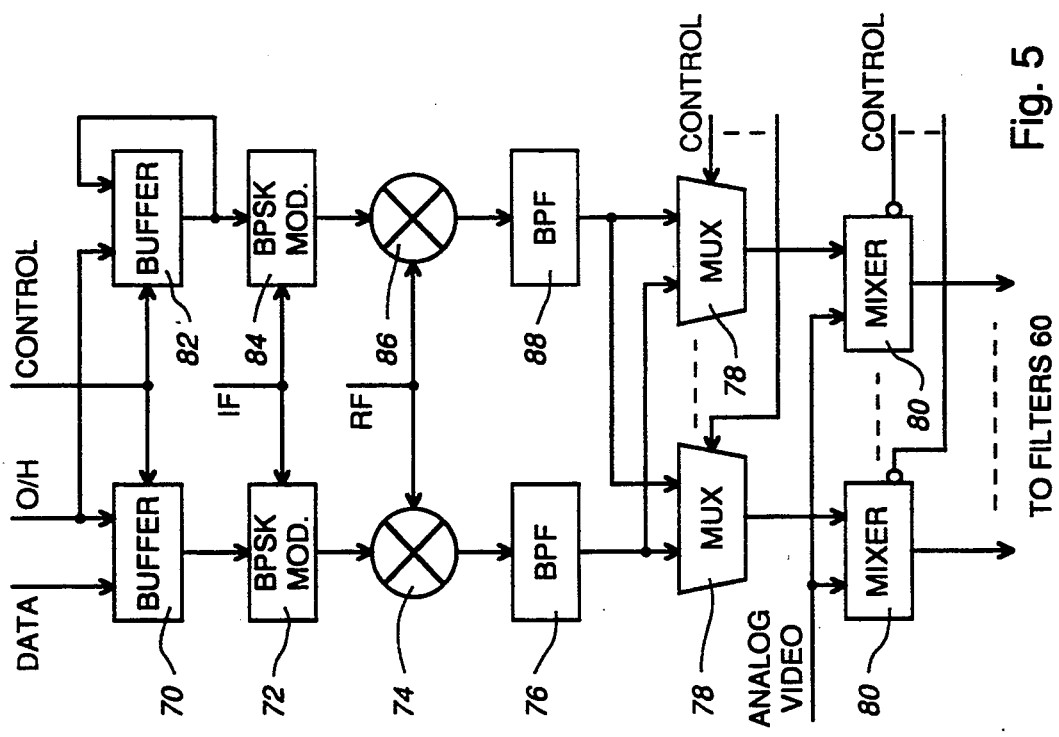
FIG. 5 is a more detailed block diagram of a transmitter of the drop unit of FIG. 4.

FIG. 1 illustrates parts of a conventional cable television distribution arrangement, shown above a broken line, 10, which is supplemented with an additional bidirectional transmission capability, shown below the broken line 10. As is well known, the conventional cable television distribution arrangement comprises abridger amplifier 12, coaxial cables 14, passive customer taps (TAP) 16, line extenders 18, and a coaxial drop cable 20 to a television receiver (TV) 22 in customer premises 24.

The additional bidirectional transmission capability comprises optical fiber termination units (FTUs) 26 and optical fibers 28 connected thereto. Each FTU 26 is inserted into the path of a coaxial cable 14 following abridger amplifier 12 or line extender 18, and serves to supply to the coaxial cable 14 in the downstream direction (from the so-called head end, not shown, to the customer premises) digital signals at frequencies above those of the analog television signals already carried by the cable 14, as further described below. The arrangement generally also includes termination units (T) 30 which are inserted into the coaxial cable 14 preceding the line extenders 18 and serve substantially to eliminate the high frequency digital signals from being supplied to the line extenders and from being reflected back to the taps 16. However, if the coaxial cable 14 is sufficiently long, so that the high frequency digital signals are sufficiently attenuated, and the bandwidth of the line extenders 18 is sufficiently restricted (for example to 50 MHz), then termination units 30 can be omitted.

The high frequency digital signals are carried from the head end via the optical fibers 28 to each FTU 26. As illustrated in FIG. 1, different FTUs can be coupled individually to a respective fiber 28, or a plurality of FTUs 26 can be coupled via an optical splitter 32 to a common fiber 28 extending from the head end. In either case, the FTU 26 inserts the high frequency digital signals onto the coaxial cable 14 so that these are carried with the analog television signals as far as the next termination unit 30 or line extender 16. The analog and digital signals are then available to the customer premises 24 via the customer taps 16, which are supplemented with a drop unit described further below for supplying signals to set-top units (STU) 34 within the customer premises 24, via the existing cable drops 20. As this invention is not directly concerned with the FTUs 26 and the set-top units 34, these are not further described here.

In the opposite, upstream, direction of transmission, a unit 34 can send control signals (for example, television program requests) and optionally other information to the head end via the coaxial cable drop 20, customer tap 16, coaxial cable 14, FTU 26, and optical fibers 28. Different wavelengths or other forms of multiplexing can conveniently be used for the different directions of transmission on the optical fibers 28.

Referring to FIG. 2, conventional analog VHF and UHF television signals and FM radio signals are carried by the coaxial cables 14 at frequencies from 50 to 550 MHz. Additional UHF television signals may possibly be present at higher frequencies, for example about 33 additional signals at frequencies from 550 MHz up to about 750 MHz, depending upon the bandwidth of the bridger amplifiers 12 and line extenders 16 and the attenuation of the coaxial cables 14.

At higher frequencies, in a frequency range from 750 to 950 MHz, a fast 16 QAM (quadrature amplitude modulated) digital signal channel is supplied from the FTUs 26 to the coaxial cable 14. This can provide a dam rate of 600 Mb/s, and thus can accommodate 200 compressed digital video signals each with a bit rate of 3 Mb/s. A second similar channel is provided in a frequency range from 950 to 1150 MHz, accommodating another 200 digital video signals, and a third similar channel can be provided in the frequency range form 550 to 750 MHz to accommodate a further 200 digital video signals, replacing a smaller number of possible analog television signals in this frequency range.

For the upstream direction of transmission, control signals can be carried in the relatively low frequency range from 5 to 30 MHz, but preferably control signals and possibly other data are carded in a QPSK (quadrature phase shift keyed) channel providing an upstream bit rate of 300 Mb/s in a frequency range from 1150 to 1350 MHz, as shown in FIG. 2.

On the coaxial cable drops 20, the radio frequency spectrum is as shown in FIG. 3. Up to 750 MHz, the spectrum is the conventional analog signal spectrum in the frequency range from 50 to 750 MHz, with the option of low frequency upstream control signals in the frequency range from 5 to 30 MHz as described above. The digital video signals are carried downstream on the cable drops 20 to the customer premises in the form of a BPSK (binary phase shift keyed) signal providing a bit rate of 150 Mb/s in a frequency range from 750 to 950 MHz. This bit rate can accommodate 50 compressed digital video signals each with a bit rate of 3 Mb/s. Control signals and other data are preferably carried upstream via the cable drops 20 by a multiple access BPSK signal providing the same bit rate of 150 Mb/s in a frequency range from 950 to 1150 MHz.

It should be appreciated that the high frequency digital signals are subject to the same attenuation on the coaxial cables that analog signals at the same frequencies would be. However, although analog television signals at these frequencies are impractical in the network, it is practical to detect and regenerate the digital signals at these frequencies, and they are not conducted via the bridger amplifiers 12 and line extenders 16 with their relatively restricted bandwidths.

Figure 4:
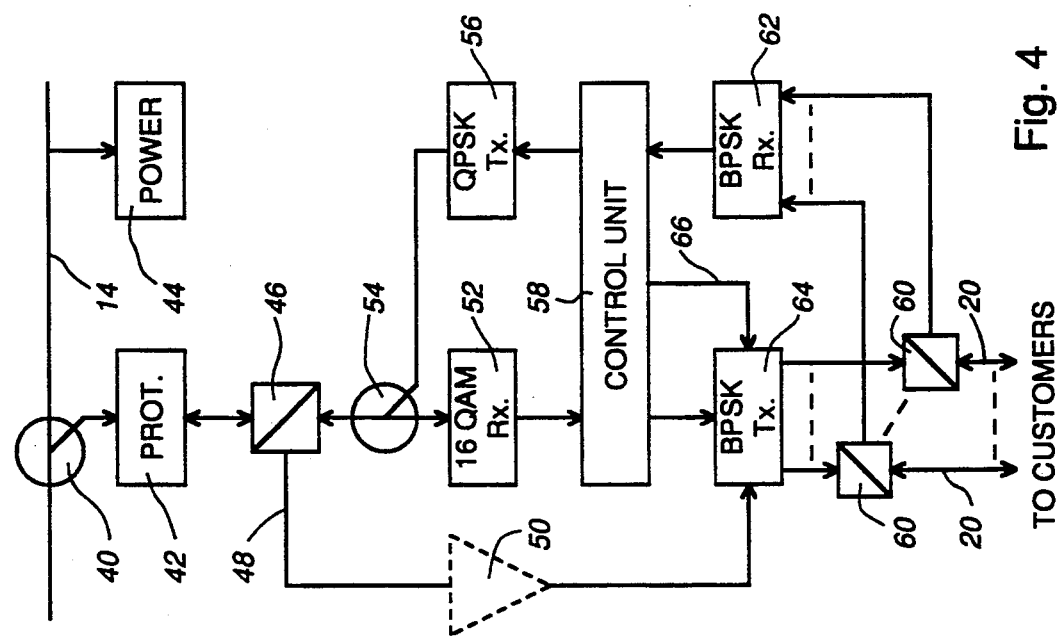
FIG. 4 shows a block diagram of a drop unit used in the network of FIG. 1 in accordance with an embodiment of the invention.

FIG. 4 illustrates a drop unit which, as indicated above, is provided at a customer tap 16 and is provided for a group of, for example 8, customers. The drop unit includes a directional coupler 40 and protection unit 42 via which signals are derived from the coaxial cable 14 in conventional manner, and a power supply unit 44 via which power for the drop unit is derived from the coaxial cable 14 in known manner. Upstream control signals are also supplied to the cable 14 via the protection unit 42 and the coupler 40. For simplicity it is assumed in the following description that low frequency upstream control signals are not present.

The drop unit includes a diplexing filter 46 which separates the downstream analog television signals onto a path 48 which may optionally include an amplifier 50, shown in broken lines. Downstream digital signals at the higher frequencies as described above are supplied from the diplexing filter 46 to a 16 QAM receiver (Rx) unit 52 via a directional coupler 54, and upstream control signals are supplied via the directional coupler 54 to the diplexing filter 46 from a QPSK transmitter (fix) 56. A control unit 58 derives the upstream control signals from the group of customers via their coaxial cable drops 20, diplexing filters 60, and a BPSK receiver unit 62. The control unit 58 also supplies downstream digital signals, as selected by the customers, and overhead information to a BPSK transmitter unit 64 as is further described below. The transmitter unit 64 is controlled by the control unit 58 via control paths represented by a line 66 to supply to each customer only those signals to which the customer is entitled, as described further below. The transmitter unit 64 is also supplied with the downstream analog video signals from the path 48, and combines these with the downstream BPSK digital signals for supply to the coaxial cable drops 20 via the diplexing filters 60.

As can be appreciated, the units 52, 56, and 58 serve to provide communications with an FTU 26 and the head end of the network, for supply of desired digital signals to the group of customers served by the drop unit. Thus the receiver unit 52 can comprise a plurality of receivers for receiving the downstream digital signals in the frequency ranges as described above with reference to FIG. 2, and the transmitter 56 operates in the upstream frequency range also as described above with reference to FIG. 2. The control unit 58 can derive the selected downstream digital signals for supply to the customers in any desired manner. For example, the signals may be communicated using ATM (asynchronous transfer mode) techniques, with the data of each digital video signal channel being identified by the label in each ATM cell carrying that data, and the control unit 58 using the cell label to determine whether or not to supply the cell data to the transmitter unit 64. ATM cells can also be sent from the head end to the drop unit to inform the control unit 58 of the signal entitlement of each customer served by the drop unit. As this invention is not directly concerned with the details of the units 52, 56, and 58, these are not further described here.

Referring to FIG. 5, the BPSK transmitter unit 64 includes a downstream data path including a buffer 70, a BPSK modulator 72, an up-converter 74, a bandpass filter (BPF) 76, and, for each customer in the group of customers supplied via this transmitter unit, a respective analog multiplexer (MUX) 78 and analog mixer 80. The transmitter unit 64 also includes a pseudo data path comprising a buffer 82, a BPSK modulator 84, an up-converter 86, and a bandpass filter (BPF) 88. Overhead information (O/H) is supplied from the control unit 58 to both of the buffers 70 and 82, and hence to both the data path and the pseudo data path.

Under the control of the control unit 58, the data of each digital signal which is to be supplied to any one or more of the customers in the group is derived from the receiver unit 52 and supplied to the buffer 70, together with the overhead information which for example serves for polling different customer premises units 34 for information to be transmitted upstream in a multiple access manner. The data and overhead information are read out from the buffer 70 under the control of the control unit 58 to modulate an IF (intermediate frequency) signal supplied to the BPSK modulator 72. The resulting modulated IF signal is converted to the RF (radio frequency) spectrum described above with reference to FIG. 3 by the up-converter 74 to which an RF signal is supplied, and the resulting RF signal is filtered in the bandpass filter 76. The resulting data modulated RF signal is supplied from the output of the bandpass filter 76 to a first input of each of the multiplexers 78.

The control unit 58 simultaneously controls the buffer 82 to store the overhead information when this is stored in the buffer 70, and to store pseudo data, recycled from the output of the buffer 82, when real digital signal data is stored in the buffer 70. The resulting pseudo data and overhead information is supplied in a similar manner under the control of the control unit 58 to modulate the IF signal in the modulator 84, the resulting modulated signal similarly being converted to the same RF range in the up-converter 86 and filtered in the bandpass filter 88. The resulting pseudo data modulated RF signal is supplied to a second input of each of the multiplexers 78.

For each customer, the control unit 58 supplies to a control input of the respective multiplexer 78 a control signal to select, and pass on to the respective mixer 80, either the data modulated RF signal at its first input or the pseudo data modulated RF signal at its second input. The control signal is produced by the control unit 58 to select the data modulated RF signal at the first input only for digital signals to which the respective customer is entitled, and otherwise to select the pseudo data modulated RF signal at the second input so that the customer is not supplied with other digital signals being supplied only to other customers in the same group.

Each control signal is produced by the control unit 58 so that switching in the respective multiplexer 78 between the signals at the two inputs of the multiplexer occurs only during the overhead information, and hence only at times when the same information is simultaneously present at both multiplexer inputs. This ensures that the RF spectral characteristics of the modulated signal supplied to each customer are continuously preserved, this being an important requirement.

The filters 76 and 88 may be implemented using digital signal processing techniques and hence may give rise to a memory effect in the information supplied to the multiplexer inputs; in other words, although the overhead information supplied on both the data path and the pseudo data path is the same, the data and pseudo data are different and so produce different lingering effects on the overhead information as this is supplied to the multiplexers 78. The duration of each sequence of overhead information (for example, several successive bytes) can be selected to be sufficient to accommodate this memory effect, thereby to maintain the required continuity of RF spectral characteristics during switching of the multiplexers.

The output of each multiplexer 78 is supplied to the respective mixer 80, where it is combined with the conventional analog video signals (from the path 48 in FIG. 4) for supply to the respective customer via the respective diplexing filter 60 and coaxial cable drop 20. As shown in FIG. 5, the output signal from each mixer 80 can optionally be inhibited by a further control signal from the control unit 58, to prevent delivery of any signals to a customer.

It should be appreciated that this arrangement of the BPSK transmitter unit 64 enables only two modulators (or, more exactly, two sets of units 72, 74, 76 and 84, 86, 88, each set consisting of a modulator, an up-converter, and a bandpass filter) to serve a group of for example 8 or more customers, in contrast to the prior art which would require one modulator for each customer in order to achieve the same selective supply of signals to each customer. Thus there is a substantial saving in costs and power requirements. As discussed above, the downstream BPSK spectrum on the coaxial cable drops provides a bit rate of 150 Mb/s and can accommodate 50 compressed digital video channels, which is ample to meet the total requirements for 8 or more customers.

Although a particular embodiment of the invention has been described in detail, it should be appreciated that numerous modifications, variations, and adaptations may be made without departing from the scope of the invention as defined in the claims.

In particular, it should be appreciated that the particular bit rates, RF spectra, modulation methods, and so on described above are given purely by way of example, and the invention is not in any way limited thereto. Furthermore, the particular manner described above for producing the pseudo dam signal is given by way of example, and other methods of producing a pseudo data modulated RF signal may alternatively be used. Instead of switching each multiplexer between its inputs during the overhead information, other additional information may be supplied simultaneously in both the data and pseudo data paths and switching may be carried out during such other additional information. In addition, the invention is not limited to the particular form of the network as described above, this again being given purely by way of example and explanation.

What is claimed is:

1. A data modulation arrangement for selectively distributing data to a plurality of outputs, comprising:
    a first modulator responsive to a digital data signal to produce a first modulated signal;
    a second modulator responsive to a digital pseudo data signal to produce a second modulated signal;
    a plurality of multiplexers each for supplying a modulated signal to a respective one of said plurality of outputs, each multiplexer having first and second inputs to which the first and second modulated signals, respectively, are supplied; and
    a control unit for controlling each multiplexer to supply the first and the second modulated signals selectively to the respective output;
    wherein the control unit is arranged to supply additional information simultaneously in both the digital data signal and the digital pseudo data signal, and to control each multiplexer to switch between the first and second modulated signals at its inputs only during said additional information.

2. A data modulation arrangement as claimed in claim 1 wherein the outputs comprise coaxial drop cables of a cable television distribution arrangement 3. A data modulation arrangement as claimed in claim 2 wherein the first and second modulators modulate the data signal and the pseudo data signal, respectively, to frequencies greater than 550 MHz.

4. A data modulation arrangement as claimed in claim 3 wherein each of the first and second modulators comprises a binary phase shift keyed modulator, an up-converter, and a bandpass filter.

5. A television signal distribution network including drop cables each to a respective customer for supplying analog television signals in a predetermined frequency range, the network further including a drop unit for supplying to a plurality of drop cables digital signals modulated at frequencies above said frequency range, the drop unit comprising:
    a plurality of multiplexers each having first and second inputs and an output coupled to a respective one of said plurality of drop cables;
    a first modulator, for modulating digital signals for customers associated with said plurality of drop cables to frequencies above said predetermined frequency range, having an output coupled to the first input of each of the plurality of multiplexers;
    a second modulator for modulating a pseudo data signal to said frequencies above said predetermined frequency range, having an output coupled to the second input of each of the plurality of multiplexers; and
    a control unit for controlling each of the plurality of multiplexers to couple its first or its second input selectively to its output;
    wherein the first modulator is arranged to modulate additional information with the digital signals, the second modulator is arranged simultaneously to modulate the additional information with the pseudo data signal, and the control unit is arranged to control each multiplexer to switch between its first and second inputs only during the additional information.

6. A network as claimed in claim 5 wherein the frequencies above said frequency range are greater than 550 MHz.

7. A network as claimed in claim 5 wherein each of the first and second modulators comprises a binary phase shift keyed modulator, an up-converter, and a bandpass filter.

8. A method of supplying digital signals selectively to each of a plurality of customers, comprising the steps of:
    supplying digital signals for one or more customers in a group of customers from a source of digital signals to a modulator to produce a data modulated signal;
    producing a pseudo data modulated signal having similar spectral characteristics to those of the data modulated signal; and selectively supplying the data modulated signal and the pseudo data modulated signal to each customer in said group so that each customer in said group is supplied with the data modulated signal in respect of digital signals for that customer and otherwise is supplied with the pseudo data modulated signal;

wherein parts of the pseudo data modulated signal are substantially identical to simultaneously occurring parts of the data modulated signal, and switching between the data modulated signal and the pseudo data modulated signal for each customer is carried out only during said parts of the modulated signals.

9. A method as claimed in claim 8 wherein the step of producing the pseudo data modulated signal comprises the step of supplying a source of pseudo data to a second modulator.

10. A method as claimed in claim 8 wherein the selectively supplied data modulated and pseudo data modulated signals are supplied to each customer in said group at frequencies greater than 550 MHz via a coaxial drop cable of a cable television distribution arrangement.

11. A method as claimed in claim 8 wherein said parts of the modulated signals comprise overhead information for the customers.

12. A method as claimed in claim 11 wherein the step of producing the pseudo data modulated signal comprises the step of supplying a source of pseudo data to a second modulator.

13. A method as claimed in claim 11 wherein the selectively supplied data modulated and pseudo data modulated signals are supplied to each customer in said group at frequencies greater than 550 MHz via a coaxial drop cable of a cable television distribution arrangement.

* * * * *